United States Patent [19]

Waggoner

[11] 4,391,936

[45] Jul. 5, 1983

[54] MOLDING BLENDS

[75] Inventor: Marion G. Waggoner, Hockessin, Del.

[73] Assignee: E. I. Du Pont de Nemours and Company, Wilmington, Del.

[21] Appl. No.: 407,244

[22] Filed: Aug. 11, 1982

Related U.S. Application Data

[63] Continuation-in-part of Ser. No. 208,548, Nov. 20, 1980, abandoned.

[51] Int. Cl.$^3$ ............................................. C08L 77/02
[52] U.S. Cl. ..................................................... 524/89
[58] Field of Search ......................................... 524/89

[56] References Cited

U.S. PATENT DOCUMENTS 3,320,169  5/1967  East et al. ........................... 430/110
3,442,680  5/1969  Newman ............................. 428/337

FOREIGN PATENT DOCUMENTS 1033372   7/1958  Fed. Rep. of Germany .
1373151  11/1974  United Kingdom .
215401    4/1968  U.S.S.R. .

OTHER PUBLICATIONS

M. I. Kohan, Nylon Plastics, 1973, pp. 381-383.
Chemical Abstracts, vol. 82, No. 18, 1975, p. 451, Abstract No. 118233z, Anisumova, S. V. et al., "Photopolymerizing Composition for Printing Plates".
Chemical Abstracts, vol. 69, 1968, p. 1926, Abstract No. 20357u, Kovtunenko, V. T. et al., "Paste for Polymer Dyeing".

Primary Examiner—Paul Lieberman
Assistant Examiner—Robert E. L. Sellers

[57] ABSTRACT

Certain polyamide molding blends containing carbon black and nigrosine are described which have greater elongation and impact strength than blends of such polyamide and carbon black alone.

3 Claims, No Drawings

MOLDING BLENDS

CROSS REFERENCE TO RELATED APPLICATION

This application is a continuation-in-part of application Ser. No. 208,548, filed Nov. 20, 1980 now abandoned.

FIELD OF THE INVENTION

This invention concerns polyamide molding resins, and more particularly polyamide molding resins that contain carbon black.

BACKGROUND OF THE INVENTION

Carbon black can be added to plastic molding resins to improve weathering resistance of articles molded from the resins. The carbon black acts to block or absorb ultraviolet rays. However, impact resistance and elongation are adversely affected by incorporation of carbon black into polyamide molding resins and it is desirable to treat polyamide/carbon black blends to overcome the deterioration in these properties.

SUMMARY OF THE INVENTION

It has now been found that when nigrosine is employed with carbon black in a blend with a polyamide molding resin, the resulting molding blend produces molded articles having better impact resistance and greater elongation than a resin comprising carbon black and polyamide alone.

Specifically the molding blend of this invention consists essentially of (a) at last one polyamide of film-forming molecular weight,
(b) about 1–3 percent by weight of polyamide of carbon black, and
(c) about 0.1–2 percent by weight of polyamide of nigrosine.

DESCRIPTION OF THE INVENTION

The polyamides useful herein are well known in the art. They are of film-forming molecular weight, i.e., have a number average molecular weight over 5000. The polyamide resin can be produced by condensation of equimolar amounts of a saturated organic dicarboxylic acid containing from 4–12 carbon atoms with an organic diamine containing 2–13 carbon atoms, in which the diamine can be employed, if desired, to provide an excess of amine end groups over carboxyl end groups in the polyamide. Vice versa, the diacid can be used to provide an excess of acid groups. Equally well, these polyamides may be made from acid-forming and amine-forming derivatives of said amines and acids such as esters, acid chlorides, amine salts, etc. Representative dicarboxylic acids used to make the polyamides include adipic acid, pimelic acid, suberic acid, sebacic acid, and dodecanedioic acid, while representative diamines include hexamethylenediamine and octamethylenediamine. In addition, the polyamide can also be prepared from self-condensation of a lactam. Examples of polyamides include polyhexamethylene adipamide (66 nylon), polyhexamethylene azelaamide (69 nylon), polyhexamethylene sebacamide (610 nylon), and polyhexamethylene dodecanoamide (612 nylon), poly bis-(4-aminocyclohexyl)methane dodecanoamide, or the polyamides produced by ring opening of lactams; i.e., polycaprolactam, (6 nylon), polylauryl lactam, or poly-11-aminoundecano amide. It is also possible to use polyamides prepared by the polymerization of at least two of the amines or acids used to prepare the above polymers, as for example, a polymer made of adipic acid, and isophthalic acid and hexamethylene diamine. Blends of polyamides, such as a mixture of 66 nylon and 6 nylon are also included. Preferably the condensation polyamide employed herein is polyhexamethylene adipamide (66 nylon), or a blend of polyhexamethylene adipamide (66 nylon) and polycaprolactam (6 nylon).

The carbon black can be present in an amount of about 2 percent by weight of polyamide. The nigrosine can be present in an amount of about 0.1–2 percent. Nigrosine is also known as aniline black. It is obtained by oxidation of aniline.

Preferably the carbon black and the nigrosine are employed in finely divided form. They can be each premixed with a small amount of the polyamide or another polyamide taken from the group above, and each premix then added to the polyamide. The premixing aids in dispersing the nigrosine in the final polyamide. If nigrosine is present per se during carbon black addition, poorer dispersion results.

Both the carbon black and the nigrosine can be employed in any of their commercially available forms, as blending with the polyamide is carried out by melt blending techniques in an extruder. The blended material is usually cut into pellets as it is extruded.

The improved elongation and impact strength of articles molded from the blend described herein make the blend useful in applications where flexibility and strength are desirable, such as in cable ties for outdoor use.

In the Examples which follow, tensile strength and elongation measurements were made as described in ASTM D638-77a except that samples were not conditioned at 50% relative humidity but, rather, were tested dry as molded (DAM) after conditioning for 24 hours under nitrogen at 23° C.

Flexural modulus was measured as described in ASTM D790-71 except that 3 rather than 5 specimens were tested and conditioning was carried out for 24 hours under nitrogen at 23° C. (DAM).

Notched Izod was measured by the procedure described in ASTM D256-73. Samples were tested dry as molded (DAM) after conditioning for 24 hours under nitrogen at 23° C.

EXAMPLES AND CONTROLS

The molding blends described in the following table were prepared by either (1) taking a blend of 66 nylon, 6 nylon or 612 nylon having a number average molecular weight over 5000 which contained 2 percent carbon black based on weight of polyamide and adding a premix of nigrosine material, or (2) by blending the nylon with a premix of carbon black and premix of nigrosine material. The nigrosine premix material was composed of 30% nigrosine and 70% 66 nylon. This mixture was then melt blended at temperatures 5° to 100° C. above the polyamide melting point, preferably 320° C. or below, by extruding it through a Werner and Pfleiderer extruder, 28 mm ZSK twin screw, in combination with an in-line quench tank and strand cutter, to obtain cut pellets of the mixture. The pellets were then vacuum dried overnight at 80° C. prior to molding. Test bars as required in the tests listed above were molded in 6 oz. injection molding machines at melt temperatures 5° to 10° C. above the melting point of the polyamide matrix. The mold temperature was about 90° C. with fast injection and a 20 sec/20 sec ram forward/hold cycle.

EXAMPLE 1A, 1B, 1C AND CONTROL A

In this series of experiments, a 66 nylon was employed. None of the samples exhibited brittle breaks and thus the elongation values obtained are an average of all the values obtained for each sample. Sample composition and results are shown in Table I.

TABLE I

| | COMPOSITION | | |
|---|---|---|---|
| Experiment | Nylon Base Resin | Carbon Black Concentration[1] | Nigrosine Concentration[2] |
| Control A | 66 Nylon | 2.0 | None |
| Example 1A | " | 2.0 | 0.1 |
| Example 1B | " | 2.0 | 0.4 |
| Example 1C | " | 2.0 | 2.0 |

| | RESULTS | | | |
|---|---|---|---|---|
| Experiment | Tensile Strength | Elongation Average % | Brittle Breaks | Flexural Modulus | Notched Izod Ft-Lb/in. |
| Control A | 12,930 | 17 | 0 | 463,000 | 0.8 |
| Example 1A | 12,220 | 27 | 0 | 456,000 | 1.0 |
| Example 1B | 12,240 | 24 | 0 | 447,000 | 1.0 |
| Example 1C | 12,190 | 27 | 0 | 451,000 | 0.9 |

[1]20% carbon black in 6 nylon
[2]30% nigrosine in 70% 66 nylon

EXAMPLE 2 AND CONTROL B

In these runs, a 6 nylon was employed. Sample concentration and results are shown in Table II.

TABLE II

| | COMPOSITION | | |
|---|---|---|---|
| Experiment | Nylon Base Resin | Carbon Black Concentration[1] | Nigrosine Concentration[2] |
| Control B | 6 Nylon | 2.0 | None |
| Example 2 | " | 2.0 | 0.7 |

| | RESULTS | | | |
|---|---|---|---|---|
| Experiment | Tensile Strength | Elongation Average % | Brittle Breaks | Flexural Modulus | Notched Izod Ft-Lb/in. |
| Control B | 12,300 | 48 | 0 | 440,00 | 0.8 |
| Example 2 | 11,800 | 72 | 0 | 415,000 | 1.3 |

[1]20% carbon black in 6 nylon
[2]30% nigrosine in 70% 66 nylon

EXAMPLE 3 AND CONTROLS C AND C-1

In these runs, a 612 nylon was employed. Sample composition and results are shown in Table III.

TABLE III

| | COMPOSITION | | |
|---|---|---|---|
| Experiment | Nylon Base Resin | Carbon Black Concentration[1] | Nigrosine Concentration[2] |
| Control C | 612 Nylon | None | None |
| Control C-1 | " | 2.0 | None |
| Example 3 | " | 2.0 | 0.5 |

| | RESULTS | | | |
|---|---|---|---|---|
| Experiment | Tensile Strength | Elongation Average %* | Brittle Breaks | Flexural Modulus |
| Control C | 9,345 | 64 | 0 | 342,000 |
| Control C-1 | 9,354 | 27 | 8 | 359,000 |
| Example 3 | 9,347 | 30 | 2 | 369,000 |

[1]20% carbon black in 6 nylon
[2]30% nigrosine in 70% 66 nylon
*Average does not include the brittle break

EXAMPLES 4A TO 4G AND CONTROLS D AND D-1

In this series of runs, a 66 nylon was employed. Sample composition and results are shown in Table IV.

TABLE IV

| | COMPOSITION | | |
|---|---|---|---|
| Experiment | Nylon Base Resin | Carbon Black Concentration[1] | Nigrosine Concentration[2] |
| Control D | 66 Nylon | None | None |
| Control D-1 | " | 2.0 | None |
| Example 4A | " | 2.0 | 0.1 |
| Example 4B | " | 2.0 | 0.25 |
| Example 4C | " | 2.0 | 0.5 |
| Example 4D | " | 2.0 | 2.0 |
| Example 4E | " | 1.0 | 0.5 |
| Example 4F | " | 2.0 | 0.5 |
| Example 4G | " | 3.0 | 0.5 |

| | RESULTS | | | |
|---|---|---|---|---|
| Experiment | Tensile Strength | Elongation Average* % | Brittle Breaks | Flexural Modulus | Notched Izod Ft-Lb/in. |
| Control D | 12,130 | 45 | 0 | 437,000 | 0.82 |
| Control D-1 | 12,760 | 41 | 2 | 482,000 | 0.72 |
| Example 4A | 11,945 | 63 | 2 | 464,000 | 0.77 |
| Example 4B | 12,187 | 53 | 2 | 458,000 | 0.82 |
| Example 4C | 12,165 | 66 | 3 | 450,000 | 0.81 |
| Example 4D | 11,776 | 49 | 3 | 449,000 | 0.75 |
| Example 4E | 12,066 | 51 | 2 | — | .91 |
| Example 4F | 11,767 | 46 | 3 | — | .88 |
| Example 4G | 11,912 | 45 | 3 | — | .79 |

[1]20% carbon black in 6 nylon
[2]30% nigrosine in 70% 66 nylon
*Average does not include the brittle break samples As can be seen from the Tables, the Controls demonstrate how the presence of carbon black in nylon decreases elongation and Notched Izod values over nylon alone. The elongation and Notched Izod results of the Examples compared with the Controls, shows the enhancement of these properties caused by various levels of nigrosine present.

I claim:

1. A polyamide molding blend consisting essentially of
   (a) at least one polyamide of film-forming molecular weight,
   (b) about 1-3 percent by weight of polyamide of carbon black, and
   (c) between about 0.1-2 percent by weight of polyamide of nigrosine.

2. The polyamide molding blend of claim 1 in which the polyamide is 66 nylon.

3. The polyamide molding blend of claim 1 in which the polyamide is 6 nylon.

* * * * *